United States Patent
Yu et al.

(10) Patent No.: US 12,514,461 B2
(45) Date of Patent: Jan. 6, 2026

(54) SYSTEM AND METHOD FOR ANALYZING GENE EXPRESSION USING DIFFUSION WEIGHTED MAGNETIC RESONANCE IMAGING (MRI)

(71) Applicant: Wisconsin Alumni Research Foundation, Madison, WI (US)

(72) Inventors: John-Paul Jaewoon Yu, Madison, WI (US); Ajay Paul Singh, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 212 days.

(21) Appl. No.: 18/454,589

(22) Filed: Aug. 23, 2023

(65) Prior Publication Data
US 2025/0064337 A1    Feb. 27, 2025

(51) Int. Cl.
*G01V 3/00* (2006.01)
*A61B 5/00* (2006.01)
(Continued)

(52) U.S. Cl.
CPC ............ *A61B 5/055* (2013.01); *A61B 5/0042* (2013.01); *A61B 5/7246* (2013.01);
(Continued)

(58) Field of Classification Search
CPC .............. G01R 33/287; G01R 33/4835; G01R 33/5608; A61B 2090/374
(Continued)

(56) References Cited

U.S. PATENT DOCUMENTS

2007/0043518 A1*  2/2007  Nicholson .............. G16B 20/20
                                                        702/23
2019/0365229 A1* 12/2019  Yu ..................... G01R 33/56341
(Continued)

FOREIGN PATENT DOCUMENTS

WO    WO-2018232388 A1 * 12/2018  ........... A61B 5/7267
WO    WO-2019160998 A1 *  8/2019  ........... C12Q 1/6858

OTHER PUBLICATIONS

Barnett BR, Casey CP, Torres-Vel'azquez M, Rowley PA, Yu JPJ. Convergent brain microstructure across multiple genetic models of schizophrenia and autism spectrum disorder: a feasibility study. Magn Reson Imaging 2020;70:36-42. https://doi.org/10.1016/J.MRI.2020.04.002.
(Continued)

*Primary Examiner* — Walter L Lindsay, Jr.
*Assistant Examiner* — Frederick Wenderoth
(74) *Attorney, Agent, or Firm* — Quarles & Brady LLP

(57) ABSTRACT

A system and method are provided for transcriptomic MRI (TMRI) analysis of a subject to determine diagnostic or prognostic information about the subject. The method includes accessing diffusion-weighted MR image data acquired from the subject, processing the diffusion-weighted MR image data using a multi-compartment model, and processing the diffusion-weighted MR image data using a radiomic analysis to generate texture features. The method also includes analyzing the texture features to determine diagnostic or prognostic information about the subject and generating a report communicating the diagnostic or prognostic information about the subject.

19 Claims, 8 Drawing Sheets
(5 of 8 Drawing Sheet(s) Filed in Color)

(51) Int. Cl.
    *A61B 5/055*     (2006.01)
    *G01R 33/563*    (2006.01)
(52) U.S. Cl.
    CPC ...... *A61B 5/7267* (2013.01); *G01R 33/56341* (2013.01); *A61B 2576/026* (2013.01)
(58) Field of Classification Search
    USPC .......................................................... 324/309
    See application file for complete search history.

(56) References Cited

U.S. PATENT DOCUMENTS

2021/0208229 A1\* 7/2021 Seethamraju .... G01R 33/56341
2022/0230315 A1\* 7/2022 James ................. G01R 33/465

OTHER PUBLICATIONS

Ellegood et al. (Ellegood J, Anagnostou E, Babineau BA, Crawley JN, Lin L, Genestine M, et al. Clustering autism: using neuroanatomical differences in 26 mouse models to gain insight into the heterogeneity. Mol Psychiatry 2015;20:118-25. https://doi.org/ 10.1038/MP.2014.98.).

Rowley PA, Guerrero-Gonzalez J, Alexander AL, Yu JPJ. Convergent microstructural brain changes across genetic models of autism spectrum disorder—A pilot study. Psychiatry Res Neuroimaging 2019;283:83. https://doi.org/10.1016/J.PSCYCHRESNS.2018.12.007.

Singh AP, Jain VS, Yu JP. "Diffusion radiomics for subtyping and clustering in autism spectrum disorder: A preclinical study," Magnetic Resonance Imaging. Feb. 2023.

\* cited by examiner

SYSTEM AND METHOD FOR ANALYZING GENE EXPRESSION USING DIFFUSION WEIGHTED MAGNETIC RESONANCE IMAGING (MRI)

CROSS REFERENCE TO RELATED APPLICATIONS

N/A

STATEMENT REGARDING FEDERALLY SPONSORED RESEARCH

N/A

BACKGROUND

The field of the invention is systems and methods for magnetic resonance imaging (MRI). More particularly, the invention relates to systems and methods for using MRI to assess gene expression, such as using diffusion MRI (dMRI).

A fundamental goal of neuroscience is to understand the structure and function of the brain and the neurobiological correlates that give rise to cognition and behavior. The development of magnetic resonance imaging (MRI) provided, for the first time, a powerful tool to study the in vivo brain and to uncover the neural substrates of neurologic, neurocognitive, and neuropsychiatric illness. Contemporary MRI neuroimaging techniques can only indirectly measure underlying pathology by producing imaging-derived phenotypes (IDPs), which serve as indirect macroscale proxies for the molecular processes driving pathological changes in the brain. However, brain architecture and activity are governed by transcriptomic measures. Thus, MRI, and other modern in vivo imaging modalities, are unable to provide clinicians and researchers with the governing molecular processes that underly the macroscale anatomy and limited physiology that can be imaged at this time.

Thus, it would be desirable to have a system and method for non-invasively interrogating the underlying molecular processes of a neurobiology patient.

SUMMARY

The present disclosure overcomes the aforementioned drawbacks by providing systems and methods for using an MRI system to derive information about gene expression and provide an in vivo analysis of the brain in healthy and disease states that goes beyond the anatomical or basic physiological information traditionally available via MRI. For example, unlike traditional MRI that provides anatomical information or limited neuro-physiological information, such as using the blood-oxygen-level-dependent (BOLD) contrast mechanism levered in functional MRI (fMRI), the systems and methods provided herein can utilize dMRI and new analysis techniques to derive information about gene expression.

In accordance with one aspect of the disclosure, a magnetic resonance imaging (MRI) system is provided that includes a magnet system configured to generate a polarizing magnetic field about at least a portion of a subject arranged in the MRI system, a plurality of gradient coils configured to apply a gradient field to the polarizing magnetic field, and a radio frequency (RF) system configured to apply an excitation field to the subject and acquire MR image data from the subject. The system also includes a computer system programmed to control the plurality of gradient coils and the RF system to acquire diffusion-weighted MR image data and process the diffusion-weighted MR image data using a radiomic analysis to generate texture features. The computer system is further programmed to analyze the texture features to determine diagnostic or prognostic information about the subject and generate a report communicating the diagnostic or prognostic information about the subject.

In accordance with another aspect of the disclosure, a method is provided for performing transcriptomic MRI (TMRI) analysis of a subject. The method includes accessing diffusion-weighted MR image data acquired form the subject, processing the diffusion-weighted MR image data using a multi-compartment model, and processing the diffusion-weighted MR image data using a radiomic analysis to generate texture features. The method further includes analyzing the texture features to determine diagnostic or prognostic information about the subject and generating a report communicating the diagnostic or prognostic information about the subject.

The foregoing and other aspects and advantages of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
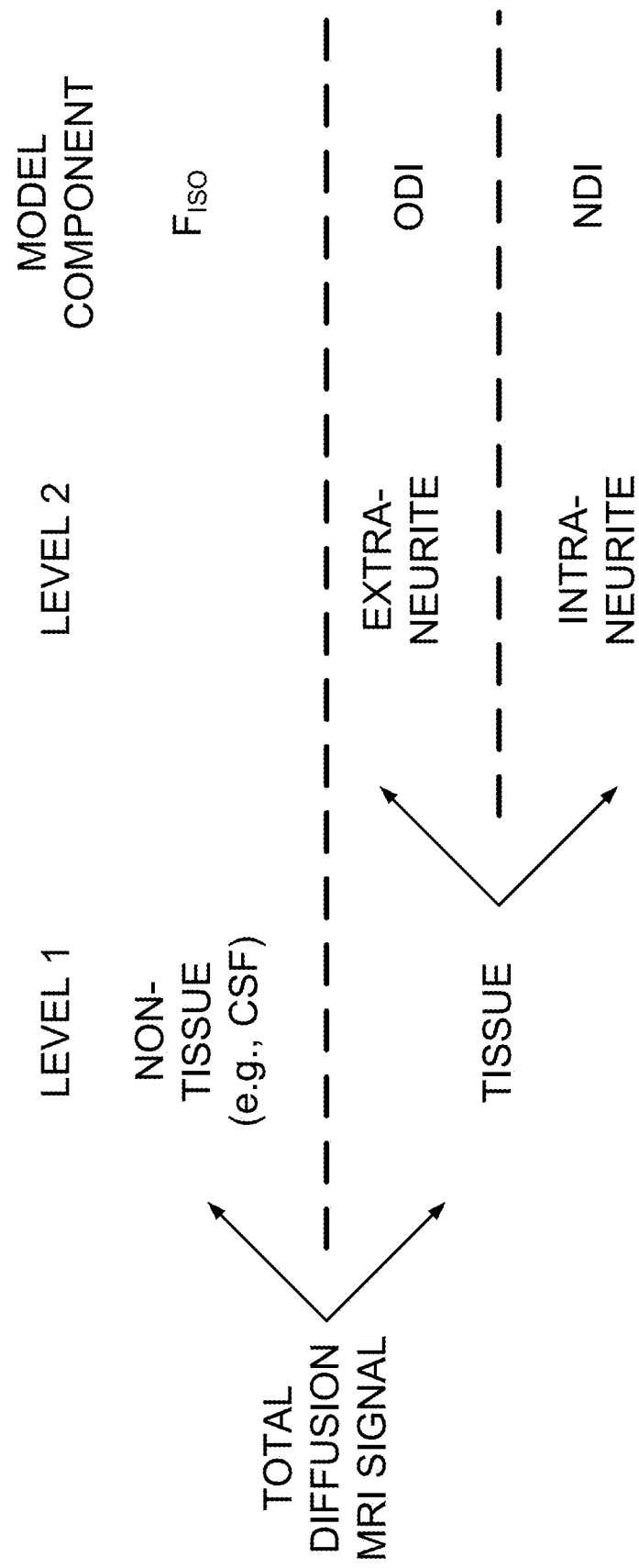
FIG. 1 is a graphic illustration of a tissue model in accordance with the present disclosure.

Diffusion MRI (dMRI), also referred to as diffusion-weighted imaging (DWI), enables non-invasive characterization of neuronal cytoarchitecture at the meso-scale (1-100 μm) by measuring the water diffusion signal and provides a technical approach towards characterizing clinical conditions. As water diffuses in the complex cellular microenvironment, its movement is hindered or restricted by biophysical components such as cell membranes and extracellular structures. Therefore, the measured diffusion signal more directly relates to underlying cellular and molecular phenomenon than traditional structural (T1, T2) or functional MRI (e.g., BOLD contrast) neuroimaging techniques.

More recently, mathematical and technical advances have improved upon standard DWI techniques (such as diffusion tensor imaging) to enable higher sensitivity and specificity of microstructural properties through multicompartment diffusion weighted imaging (MC-DWI). MC-DWI produces greater tissue specificity than standard DWI techniques by employing biophysical model-based strategies designed to measure water diffusion in distinct tissue compartments. With this technique, the water diffusion signal specific to the intra-neurite, extra-neurite, and cerebral spinal fluid (CSF) compartments can be calculated. In doing so, MC-DWI data, fitted to biophysical models like neurite orientation dispersion and density index (NODDI), have demonstrated increased sensitivity and specificity to neurological changes associated with neurodevelopmental and neurodegenerative diseases. Recent human studies have used the NODDI model to detect microstructural changes in autism spectrum disorder (ASD) patients which have been correlated with abnormal sensory processing. Further studies have demonstrated the ability to distinguish control adults from ASD adults using intra-neurite and CSF signal from the NODDI model. In line with these results, recent work has demonstrated the ability of the NODDI model's signal to sensitively capture neuroimaging differences in genetic and small animal models of neuropsychiatric illness.

Despite the sensitivity of the NODDI model to microstructural changes, these identified differences remain non-specific as similar changes can be identified in other neurological conditions. Thus, this non-specificity from the analyzed diffusion signal makes these differences unsuitable as putative neuroimaging biomarkers of clinical conditions.

Conventional methods for analysis of diffusion data rely primarily on voxel-wise comparisons to identify differences in diffusion across the whole brain (e.g., tract based- and gray matter based-spatial statistics) or rely on the mean signal to perform region of interest (ROI)-based investigations. These conventional analyses likely contribute to the observed non-specificity in imaging findings that limit effective interpretation. Voxel-wise comparisons are often hypothesis-free and usually reveal disparate differences across the brain; interpretability, however, is limited as the relationship to functional neuroanatomical structures is not apparent. ROI-based investigations provide the advantage of targeting an area of interest, though these analyses have only used one measurement (mean signal values) for describing an ROI. While more interpretable, this one measurement alone cannot provide enough information to specifically parse the complex biology underlying identified differences in the diffusion signal.

Thus, current systems and methods for studying neurobiology are highly limited. To date, a considerable body of work has established the sensitivity of MRI to neurobiology. This sensitivity, however, comes with a sharp tradeoff in specificity. The non-specificity of MRI arises because of how the MRI signal is processed, where for a given pulse sequence, only a single MR measure is typically reported. Some have attempted to correlate these single and multiple combinations of MR measurements (e.g., R1, R2*) to gene expression data. However, the limited number of measurements available ultimately restricts the ability to generate interpretable and generalizable correlations between MRI measures and gene expression. Previous work has also sought to develop new MR contrast mechanisms to expand the number of measurements available to correlate to genetic data. All of these efforts have failed to provide sufficient information to utilize MRI as a tool to readily understand the gene expression of a given patient.

Instead of attempting to create a new contrast mechanism or attempt to combine a wide variety MR signals or known contrast mechanisms into a grand correlation of gene expression, the present disclosure provides systems and methods that use neurobiologically sensitive MR pulse sequences that are parameterized to generate a sufficient number of measurements that are correlated to gene expression. As will be described, systems and methods are provided to perform a texture-based analysis of the MR data to quantify spatial arrangement of intensities in an image and generate quantitative image parameters and make MR-transcriptomic correlations.

To improve the specificity of imaging data, the present disclosure recognizes that image analysis techniques such as radiomics can be employed. Radiomics is the quantification of highly parameterized texture features from medical images. Texture features (radiomic features) capture the spatial relationship between signals in an image. The use of these features is predicated on the ability to determine that radiomic features capture specific information about the underlying pathophysiology of the imaged region and, importantly, expand the available measurements that can be calculated and subsequently associated to underlying neurobiology.

As described herein, a multi-compartment diffusion model can be used to quantitatively express how the total normalized diffusion MRI signal is comprised by: (1) anisotropic diffusion within neuronal process and (2) anisotropic diffusion arising from around these processes. As illustrated in FIG. 1, a neurite orientation dispersion and density imaging (NODDI) model can be used that advances multi-compartment diffusion imaging as a clinically feasible imaging technique and leveraged to understand the underlying neurobiological gene expression. Other techniques can also be used, such as diffusion spectrum imaging (DSI) or ActiveAx or other MC-DWI models.

To generate greater tissue specificity than standard diffusion weighted imaging (DWI) techniques such as DTI, NODDI employs a model-based strategy designed to measure water diffusion arising from distinct tissue compartments. Specifically, FIG. 1 provides a NODDI tissue model that is a multi-compartmental model of the total normalized diffusion MRI signal and comprises: (1) non-tissue ($F_{iso}$); (2) extraneurite (orientation dispersion index, ODI); and (3) intraneurite (neurite density index, NDI). Non-tissue material, such as cerebral spinal fluid (CSF), represents a first level (level 1) of the model and can be modeled as a volume. Also at level 1 is tissue. However, unlike traditional models that model tissue as a single signal, a second level (level 2) is included that divides signals that otherwise would be attributed to "tissue" to be formed as extra-neurite material, such as cell bodies and glial cells (ODI) and intra-neurite material, such as axons and dendrites (NDI).

In the NODDI model, diffusivity in the extra-neurite compartment is measured by ODI, which was originally conceptualized to measure how changes in neurite dispersion influence water diffusivity in the extra-neurite space without accounting for the potential contribution that glial cells (such as microglia) can have on quantitative measures of ODI. However, within the extra-neurite compartment, glial cells reside, which account for a large percentage of non-neuronal cells.

Figure 2:
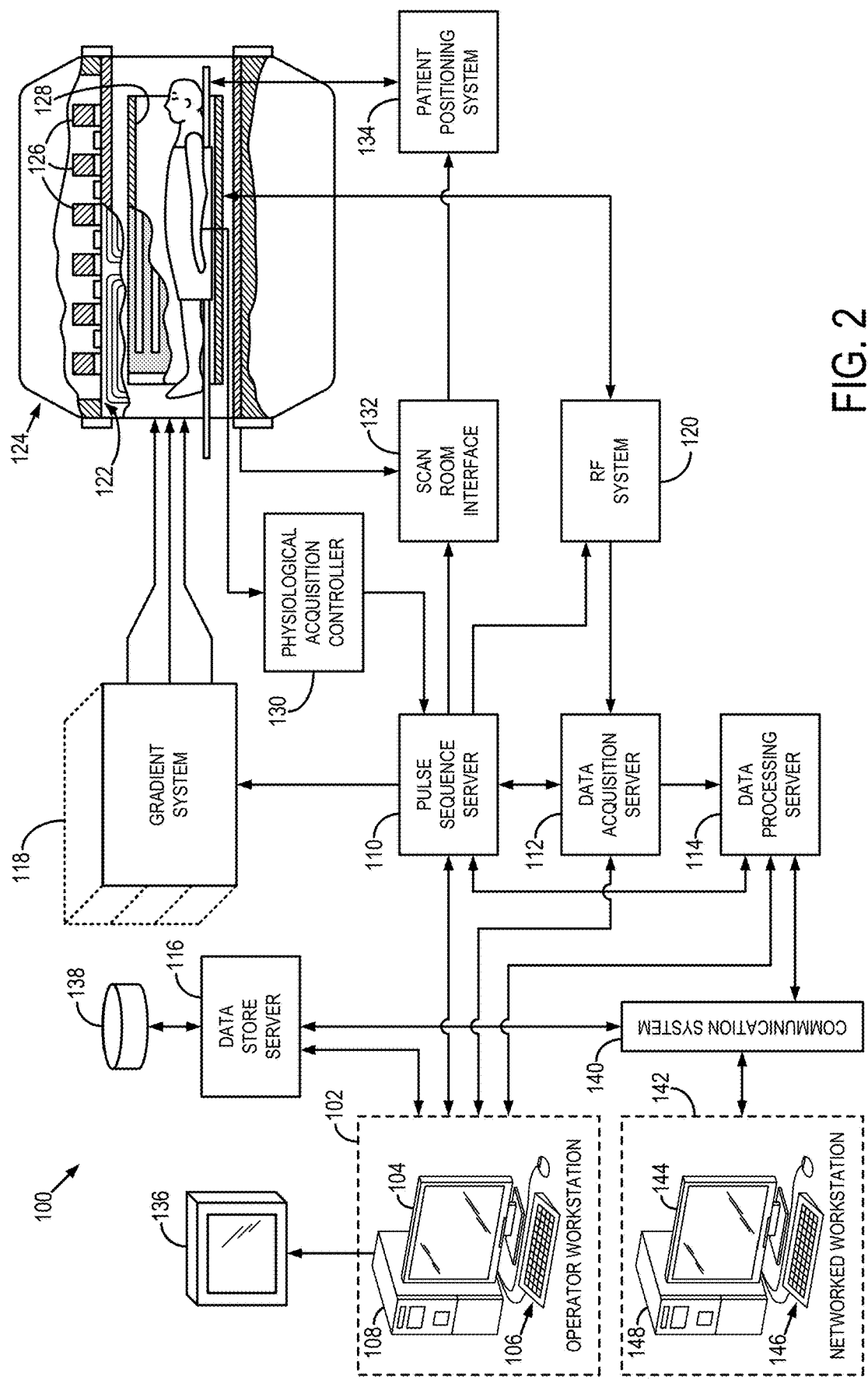
FIG. 2 is a block diagram of an exemplary magnetic resonance imaging ("MRI") system configured in accordance with the present disclosure.

Referring now to FIG. 2, a magnetic resonance imaging (MRI) system 100 configured to carry out the processes and techniques described herein is illustrated in FIG. 2. The MRI system 100 includes an operator workstation 102, which will typically include a display 104, one or more input devices 106 (such as a keyboard and mouse or the like), and a processor 108. The processor 108 may include a commercially available programmable machine running a commercially available operating system. The operator workstation 102 provides the operator interface that enables scan prescriptions to be entered into the MRI system 100. In general, the operator workstation 102 may be coupled to multiple servers, including a pulse sequence server 110; a data acquisition server 112; a data processing server 114; and a data store server 116. The operator workstation 102 and each server 110, 112, 114, and 116 are connected to communicate with each other. For example, the servers 110, 112, 114, and 116 may be connected via a communication system 140, which may include any suitable network connection, whether wired, wireless, or a combination of both. As an example, the communication system 140 may include both proprietary or dedicated networks, as well as open networks, such as the internet.

The pulse sequence server 110 functions in response to instructions downloaded from the operator workstation 102 to operate a gradient system 118 and a radiofrequency ("RF") system 120. Gradient waveforms to perform the prescribed scan are produced and applied to the gradient system 118, which excites gradient coils in an assembly 122 to produce the magnetic field gradients $G_x$, $G_y$, $G_z$ used for position encoding magnetic resonance signals. The gradient coil assembly 122 forms part of a magnet assembly 124 that includes a polarizing magnet 126 and a whole-body RF coil 128.

RF waveforms are applied by the RF system 120 to the RF coil 128, or a separate local coil (not shown in FIG. 2), in order to perform the prescribed magnetic resonance pulse sequence. Responsive magnetic resonance signals detected by the RF coil 128, or a separate local coil, are received by the RF system 120, where they are amplified, demodulated, filtered, and digitized under direction of commands produced by the pulse sequence server 110. The RF system 120 includes an RF transmitter for producing a wide variety of RF pulses used in MRI pulse sequences. The RF transmitter is responsive to the scan prescription and direction from the pulse sequence server 110 to produce RF pulses of the desired frequency, phase, and pulse amplitude waveform. The generated RF pulses may be applied to the whole-body RF coil 128 or to one or more local coils or coil arrays.

The RF system 120 also includes one or more RF receiver channels. Each RF receiver channel includes an RF preamplifier that amplifies the magnetic resonance signal received by the coil 128 to which it is connected, and a detector that detects and digitizes the/and Q quadrature components of the received magnetic resonance signal. The magnitude of the received magnetic resonance signal may, therefore, be determined at any sampled point by the square root of the sum of the squares of the I and Q components:

$$M = \sqrt{I^2 + Q^2};\qquad\text{Eqn. 3}$$

and the phase of the received magnetic resonance signal may also be determined according to the following relationship:

$$\varphi = \tan^{-1}\left(\frac{Q}{I}\right).\qquad\text{Eqn. 4}$$

The pulse sequence server 110 also optionally receives patient data from a physiological acquisition controller 130. By way of example, the physiological acquisition controller 130 may receive signals from a number of different sensors connected to the patient, such as electrocardiograph ("ECG") signals from electrodes, or respiratory signals from a respiratory bellows or other respiratory monitoring device. Such signals are typically used by the pulse sequence server 110 to synchronize, or "gate," the performance of the scan with the subject's heart beat or respiration.

The pulse sequence server 110 also connects to a scan room interface circuit 132 that receives signals from various sensors associated with the condition of the patient and the magnet system. It is also through the scan room interface circuit 132 that a patient positioning system 134 receives commands to move the patient to desired positions during the scan.

The digitized magnetic resonance signal samples produced by the RF system 120 are received by the data acquisition server 112. The data acquisition server 112 operates in response to instructions downloaded from the operator workstation 102 to receive the real-time magnetic resonance data and provide buffer storage, such that no data is lost by data overrun. In some scans, the data acquisition server 112 does little more than pass the acquired magnetic resonance data to the data processor server 114. However, in scans that require information derived from acquired magnetic resonance data to control the further performance of the scan, the data acquisition server 112 is programmed to produce such information and convey it to the pulse sequence server 110. For example, during prescans, magnetic resonance data is acquired and used to calibrate the pulse sequence performed by the pulse sequence server 110. As another example, navigator signals may be acquired and used to adjust the operating parameters of the RF system 120 or the gradient system 118, or to control the view order in which k-space is sampled. In still another example, the data acquisition server 112 may also be employed to process magnetic resonance signals used to detect the arrival of a contrast agent in a magnetic resonance angiography ("MRA") scan. By way of example, the data acquisition server 112 acquires magnetic resonance data and processes it in real-time to produce information that is used to control the scan.

The data processing server 114 receives magnetic resonance data from the data acquisition server 112 and processes it in accordance with instructions downloaded from the operator workstation 102. Such processing may, for example, include one or more of the following: reconstructing two-dimensional or three-dimensional images by performing a Fourier transformation of raw k-space data; performing other image reconstruction techniques, such as iterative or backprojection reconstruction techniques; applying filters to raw k-space data or to reconstructed images; generating functional magnetic resonance images; calculating motion or flow images; and so on.

Images reconstructed by the data processing server 114 are conveyed back to the operator workstation 102. Images may be output to operator display 112 or a display 136 that is located near the magnet assembly 124 for use by an attending clinician. Batch mode images or selected real time images are stored in a host database on disc storage 138. When such images have been reconstructed and transferred to storage, the data processing server 114 notifies the data store server 116 on the operator workstation 102. The operator workstation 102 may be used by an operator to archive the images, produce films, or send the images via a network to other facilities.

The MRI system 100 may also include one or more networked workstations 142. By way of example, a networked workstation 142 may include a display 144, one or more input devices 146 (such as a keyboard and mouse or the like), and a processor 148. The networked workstation 142 may be located within the same facility as the operator workstation 102, or in a different facility, such as a different healthcare institution or clinic. The networked workstation 142 may include a mobile device, including phones or tablets.

The networked workstation 142, whether within the same facility or in a different facility as the operator workstation 102, may gain remote access to the data processing server 114 or data store server 116 via the communication system 140. Accordingly, multiple networked workstations 142 may have access to the data processing server 114 and the data store server 116. In this manner, magnetic resonance data, reconstructed images, or other data may be exchanged between the data processing server 114 or the data store server 116 and the networked workstations 142, such that the data or images may be remotely processed by a networked workstation 142. This data may be exchanged in any suitable format, such as in accordance with the transmission control protocol ("TCP"), the internet protocol ("IP"), or other known or suitable protocols.

Figure 3:
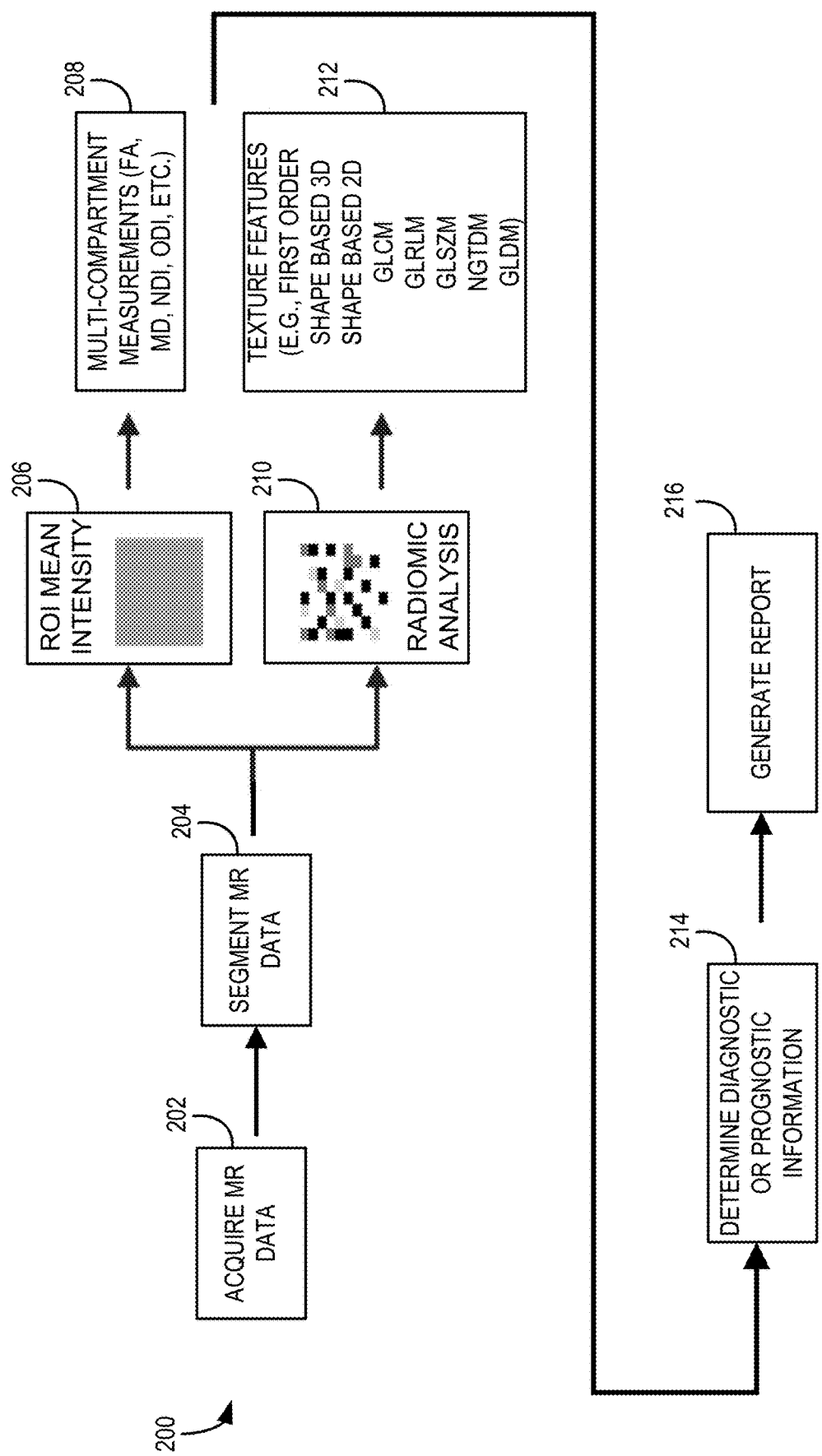
FIG. 3 is a flow chart setting forth steps of a process utilizing the model and system of FIGS. 1 and 2 in accordance with the present disclosure.

The system of FIG. 2 can be used to perform a process for acquiring MRI data and processing the MRI data using radiomic analysis of a multi-compartment DWI model to determine information on the underlying gene expression of the patient and, thereby, aid clinical analysis far beyond extrapolating from anatomical images, or extrapolated physiological biomarkers, such as BOLD or diffusion, contrast-weighted imaging. Referring to FIG. 3, such a process 200 begins with the acquisition of MR data at process block 202, such as by accessing already-acquired MR data or acquiring MR data from a patient, such as using the system of FIG. 2. As described above, the MR data may include diffusion MRI (dMRI) data. Furthermore, as described, the dMRI data may be acquired with the intent of analyzing the data using a multi-compartment model, such as described above with respect to FIG. 1. At process block 204, the dMRI data is processed to segment the MR data, for example, using anatomical atlas information or the like for processing diffusion data. The segmented MR data is then processed along two tracks, which as illustrated may be done in parallel, in one non-limiting example.

In a first track, the mean intensity of a selected region of interest (ROI) is determined at process block 206 and then MRI measurements are calculated at process block 208. For example, the MRI measurements may include fractional anisotropy (FA), mean diffusivity (MD), NDI, and ODI, in addition to others, such as axial diffusivity (AD), radial diffusivity (RD), or the like.

In parallel or series, the process 200 may also include performing radiomic analysis at process block 210. The dMRI data may include neurite orientation dispersion and density imaging (NODDI) data. The radiomic analysis at process block 210 may be performed to determine, at process block 212, texture features. The texture features may include, as non-limiting examples, first-order statistic, shape based 3D and/or 2D, gray-level cooccurrence matrix (GLCM), gray-level run length matrix (GLRLM), gray-level size zone matrix (GLSZM), neighboring grey tone difference matrix (NGTDM), and gray-level dependence matrix (GLDM) radiomic features, among others. At process block 214, the results of the texture analysis and/or MRI measurements may be used to determine diagnostic or prognostic metrics, for example, including gene expression metrics or information.

The above-described system and method provides a transcriptomic MRI (TMRI) framework that uses multi-compartment diffusion MRI (dMRI) data to interrogate any of a variety of conditions or diseases, from neurocognitive or neuropsychological to cancer pathology. Determining the gene expression or pathophysiology to aid in diagnosis or prognosis of pathology is performed through analysis of texture features from multi-compartment diffusion weighted MR. As will be further illustrated with respect to the non-limiting examples, clustering or other analysis techniques can be used to determine the metrics and/or ultimate diagnosis or prognosis. For example, the texture features can be correlated to gene expression data of the same tissue being imaged. As another example, one or more look-up tables may be used that correlate the parameterized texture features from multi-compartment diffusion weighted medical imaging data to a given diagnosis or prognosis. Additionally, or alternatively, an artificial intelligence or machine learning system maybe trained on data, such as further described with respect to the non-limiting examples provided herein, to generate metrics or ultimate diagnosis or prognosis. This information may then be used to generate a report at process block 216. The report may include images, annotated images, maps or color-coded anatomical data, and/or text-based reporting.

Thus, the present disclosure provides systems and methods that, first, recognize that such information can be used to determine diagnosis or prognosis of neurological pathology and, second, a way to accurately and consistently generate metrics, such as gene expression metrics and/or a report of diagnosis or prognosis of neurological pathology.

In seeking to correlate gene expression to MRI measurements, the present disclosure recognized that multi-compartment diffusion imaging could be used to achieve this ambitious goal. The present disclosure recognized that, unlike conventional macromolecular or functional neuroimaging techniques, water diffusion and the measured diffusion signal is at once sensitive and biophysically responsive to molecular and cellular phenomena.

As one non-limiting example, NODDI was used. NODDI is an advanced translational dMRI technique belonging to a larger family of multi-compartment techniques, which biophysically model the dMRI signal into biologically salient compartments. That is, as described above, NODDI models neuronal (NDI) and extra-neuronal (ODI) tissue compartments that together possess sensitivity to molecular neurobiology. The present disclosure recognized that the extensive evidence supporting the correlation between gene expression and brain cellular histology and between brain cellular histology and dMRI could be leveraged to determine correlations of gene expression to measures of dMRI. Further, the present disclosure recognized that, as the diffusion signal itself is spatially defined (e.g., intraneuronal, extracellular), putative correlations of the NODDI signal to gene expression could be used to provide gene expression correlates that are themselves spatially distinct.

EXPERIMENTS

Experiment 1

To test the above-described system, a wild-type rat, and Nrxn1, Pten, Fmr1 genetic rat models of autism spectrum disorder (ASD) were used. The ASD models were chosen as the basis for this study because of the presence of both neuronal (synaptic) and extra-neuronal (perineuronal net deposition) processes in the pathophysiology of ASD. This provides an opportune test of the biological specificity of the NODDI biophysical model and how it correlates to biological processes defined by gene expression.

To do so, the researchers first performed microarray gene expression analysis of the left neocortex of all animals and identified 4399 differentially expressed genes (FDR<0.05) and in a separate cohort, performed NODDI diffusion imaging of each animal and genotype and extracted image texture features from the left neocortex of all animals. For gene expression, NDI and ODI texture feature datasets, principal components analysis (PCA) was performed to understand aspects of each dataset that captured the most variance, as illustrated in the graphs of FIGS. 4A-4G.

Figure 4A:
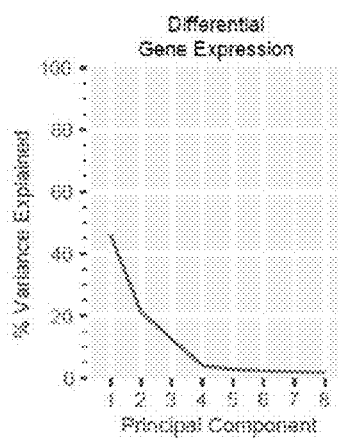
FIG. 4A is a graph showing principal component analysis of differential gene expression.
Figure 4B:
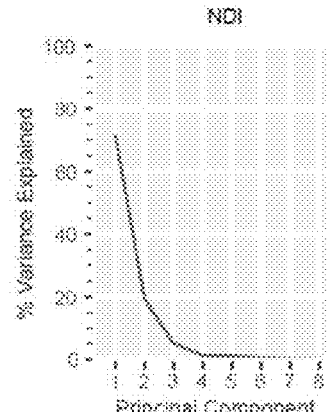
FIG. 4B is a graph showing principal component analysis of NDI texture features.
Figure 4C:
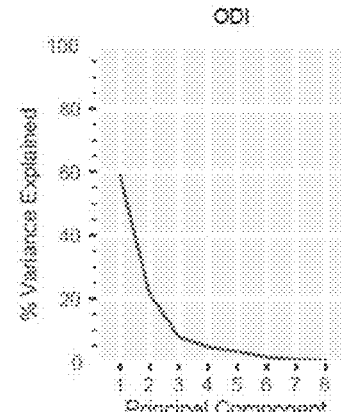
FIG. 4C is a graph showing principal component analysis of ODI texture features.
Figure 4D:
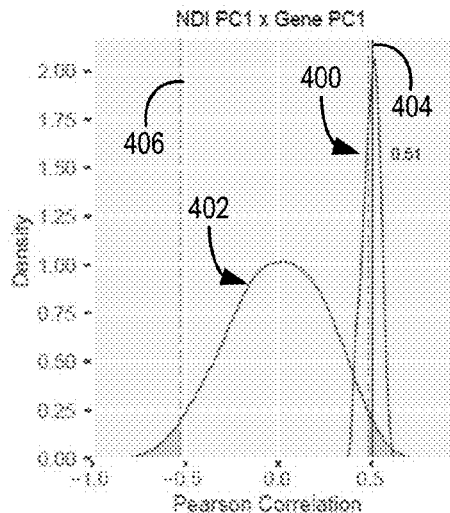
FIG. 4D is a graph showing kernel density estimation of permuted correlations for NDI PC1 and gene PC1.
Figure 4E:
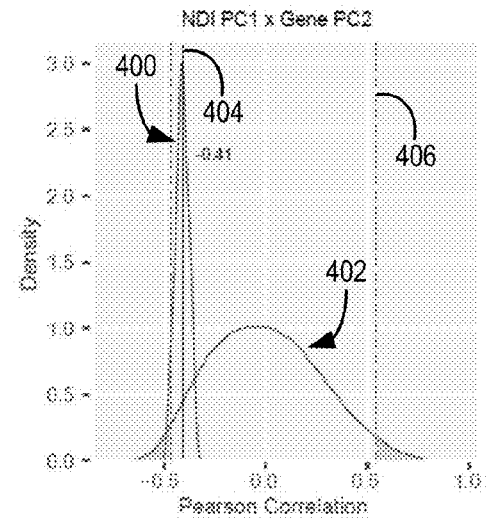
FIG. 4E is a graph showing kernel density estimation of permuted correlations for NDI PC1 and gene PC2.
Figure 4F:
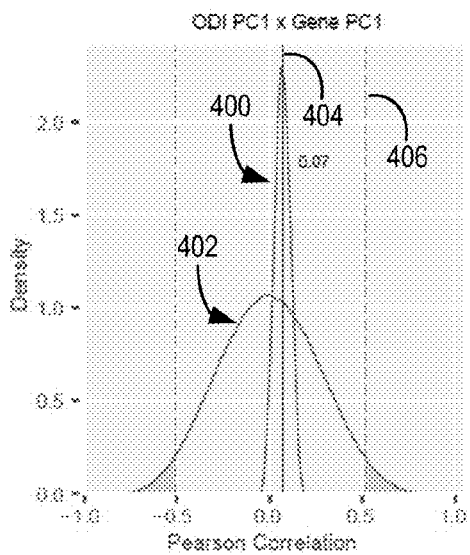
FIG. 4F is a graph showing kernel density estimation of permuted correlations for ODI PC1 and gene PC1.
Figure 4G:
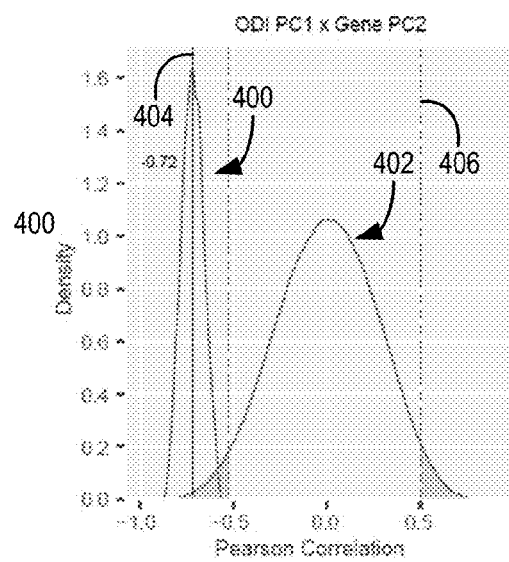
FIG. 4G is a graph showing kernel density estimation of permuted correlations for ODI PC1 and gene PC2.

More particularly, the graphs of FIGS. 4A-4G illustrate a principal component analysis for differentially gene expression (FIG. 4A), NDI texture features (FIG. 4B), and ODI texture features (FIG. 4C) was performed to show % variance for all principal components. Principal components 1 and 2 of differential gene expression captured 46.1% and 21.2% of the variance in the data, respectively. Principal components 1 and 2 of the NDI texture features captured 71.4% and 19.3% of the variance and principal component 1 and 2 of the ODI texture features 58.9% and 21.7%. Given the significant drop off in variance explained between 1 and 2 of the image texture features, downstream analysis proceeded with only the first principal component (PC 1) from both imaging signals. For FIGS. 4D-4G, kernel density estimation plots of the permuted correlations for NDI PC1 (FIGS. 4D and 4E) and ODI PC1 (FIGS. 4F and 4G) are shown with differential expressed gene PCs 1 and 2. Biology 400 indicates that the permutation accounted for the biological relationship between the two datasets (i.e., paired animals of the same genotype across the datasets). Null 402 indicates that the relationship of the genotypes across the dataset was not preserved. The solid line 404 indicates median value. A dotted line 406 indicates bounds of the 95% confidence interval around the median of the null distribution and the shaded portion indicates the tail of the distributions that account for a total of 5% of the data. Gene PC1 demonstrates strong correlation with NDI PC1 (FIG. 4D, median biology r=0.51) whereas Gene PC2 has a weaker correlation with NDI PC1 (FIG. 4E, median biology r=−0.41). For ODI, Gene PC1 correlates very weakly with ODI PC1 (FIG. 4F, median biology r=0.07). Gene PC2 demonstrates a very strong correlation with ODI PC1 (FIG. 4G, median r=−0.72). Biology median values that fall outside of the null 95% interval bounds are considered to come from significantly different distribution than the null; thus, NDI PC1×Gene PC1 and ODI PC1×Gene PC2 correlations are interpreted to represent statistically significant permuted distributions.

Using this, we next reasoned that a correlation between principal components from different datasets suggests the two datasets (e.g., imaging and gene expression) capture variation between the samples in a similar manner. Thus, if PCs from imaging and gene expression are highly correlated, this would suggest that multi-component diffusion imaging datasets are representative of underlying gene expression. To test the correlation between the principal components of the gene expression data and the imaging signals (NDI and ODI), a within-genotype permutation correlation analysis was performed as the imaging data and gene expression were generated from multiple cohorts. PC1 of NDI correlated moderately with both PC 1 and 2 of gene expression (FIGS. 4D and 4E). PC1 of ODI demonstrated strong correlation to PC2 of gene expression only (FIGS. 4F and 4G). These findings underscore the relationship between multi-compartment imaging datasets and gene expression and, moreover, show how the NDI and ODI signals correlate differently with gene expression. Specifically, these results indicate imaging-gene expression correlations may be more specific in the ODI signal as ODI only correlates with gene PC2, unlike NDI which correlates with both PCs 1 and 2 of gene expression.

To further test and demonstrate the robustness of these PC correlations, we next performed a leave one out permutation analysis and found similar levels of correlation. That similar correlation strength remained between imaging and gene expression PCs following a leave one out permutation analysis where approximately 20% of the data were removed further underscores the robustness of the relationships we found between imaging and gene expression.

Figures 5A, 5B:
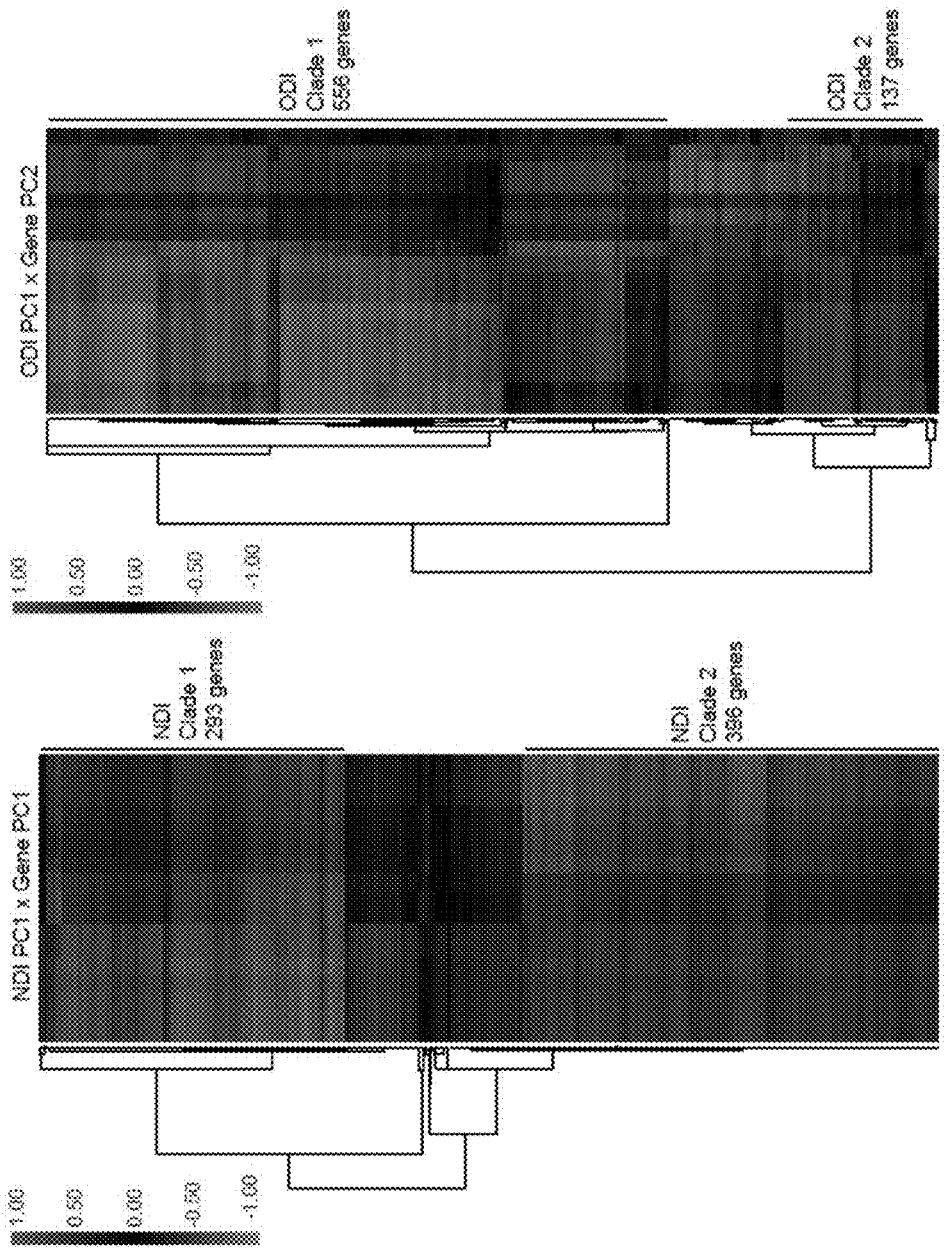
FIG. 5A is a hierarchical clustering and heatmaps of permuted correlations between the top 20% of loaded NDI PC1 features and the top 20% of loaded PC1 gene expression.
FIG. 5B a hierarchical clustering and heatmaps of permuted correlations between the top 20% of loaded ODI PC1 features and the top 20% of loaded PC2 gene expression.

To biologically contextualize the observed correlations between imaging and gene expression PCs, we extracted the top 20% of genes and image texture features loaded in each PC (880 genes per gene PC; 17 NDI and 18 ODI texture features). Referring to FIGS. 5A and 5B, we then performed a permutation correlation analysis for each gene-imaging feature combination and performed unsupervised hierarchical clustering to generate heatmaps of gene-feature associations for the NDI PC1-Gene PC1 and ODI PC1-Gene PC2 correlations (FIGS. 5A and 5B, respectively). That is, FIG. 5A shows a hierarchical clustering and heatmap of permuted correlations between the top 20% of loaded NDI PC1 features and the top 20% of loaded PC1 gene expression and FIG. 5B shows the top 20% of loaded ODI PC1 features and the top 20% of loaded PC2 gene expression.

Then for each of the heatmaps, gene clades were identified. Gene clades then underwent gene ontology (GO) cellular component overrepresentation analysis (ORA). Cellular component GO terms were specifically studied because the NODDI signal is spatially defined (NDI: neuronal; ODI: extra-neuronal/extracellular); thus, we hypothesized that enriched genes correlating to either the NDI or ODI signal would reflect gene sets that are also representative of neuronal (NDI) and extra-neuronal (ODI) processes and pathways.

Figure 6:
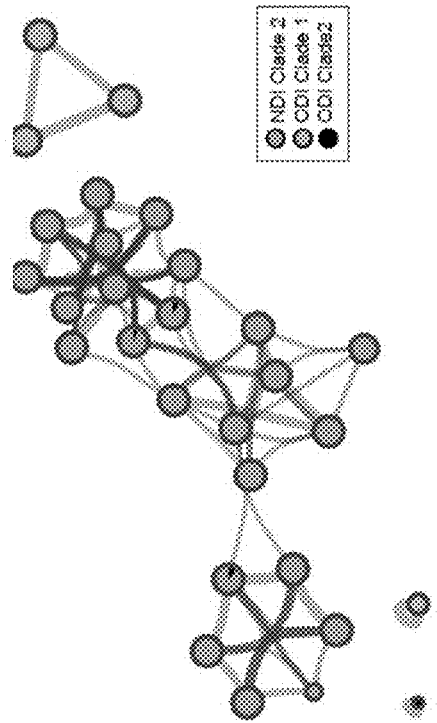
FIG. 6 is a chart showing heatmap of −log 10 p-value of the enriched gene ontology terms (significance cutoff<10-6) from the above clades demonstrates significant enrichment in three of four clades for cellular component gene ontology.

Of the 4 gene clades identified, 3 enriched for cellular components, as shown in FIG. 6. Heatmap of −log 10 p-value of the enriched gene ontology terms (significance cutoff<10-6) from the above clades demonstrated significant enrichment in three of four clades for cellular component gene ontology. ODI Clade 1 and NDI Clade 2 strongly correlate with extracellular/extraneuronal and intracellular/intraneuronal cellular components, respectively, commensurate with the biophysical compartment each NODDI signal models (e.g., ODI, extracellular/extraneuronal; NDI, intracellular/intraneuronal). ODI clade 2 additionally demonstrates significant correlation with cellular components associated with the synaptic membrane, which functionally include both neuronal and non-neuronal cellular structures (e.g., neuroglial). This observed non-specificity and apparent overlap may be related in part to overlapping GO annotations. Thus, in the largest clades identified, we found significant enrichment for extracellular matrix and collagen trimers (ODI PC1×Gene PC2; top clade) and significant enrichment for synaptic membrane, asymmetric synapses, and cation channel complex (NDI PC1×Gene PC1; bottom clade). Overall, these results find two PCs from the gene expression dataset (gene PC1 and gene PC2) each correlating to different imaging signals (NDI and ODI); specifically, the ODI signal correlates with gene expression associated with extracellular, extra-neuronal processes while the NDI signal correlates with gene expression associated with neuronal processes.

Figure 7:
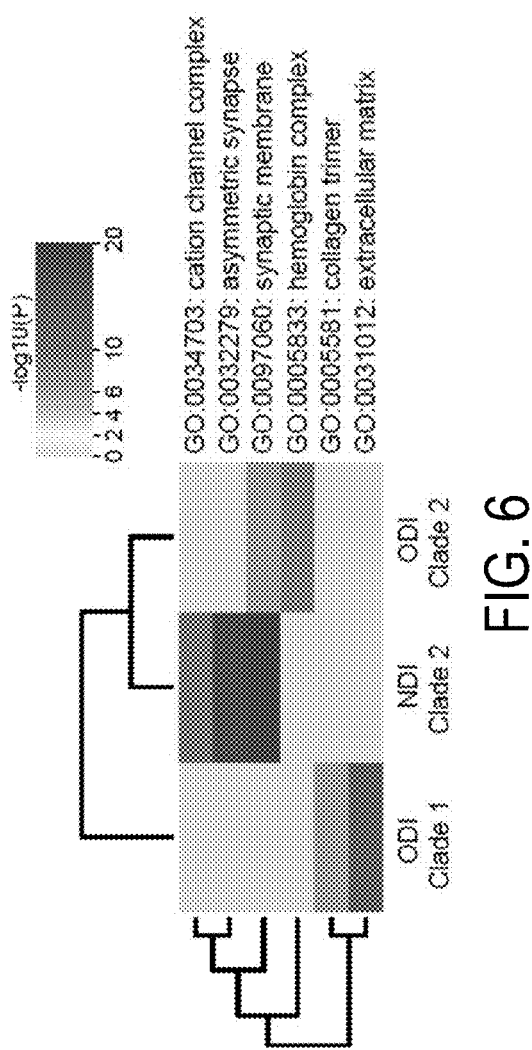
FIG. 7 is a representation of network analysis of enriched gene ontology terms demonstrating one large contiguous network of neuronal related processes and other discontinuous networks of non-neuronal processes.
Figure 8:
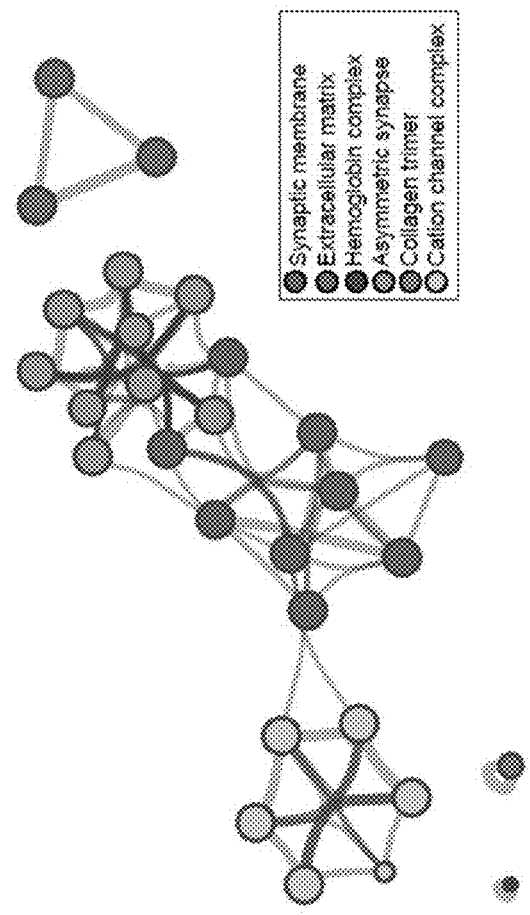
FIG. 8 is a representation of a network where, within each network (and network node), the relative contribution of GO CC terms from each clade are coded.

To further contextualize these findings, we next performed network analysis of the identified GO terms, which again demonstrates ODI primarily correlating with genes specific to extracellular/extraneuronal processes and NDI correlating primarily with genes derived from neuronal components and processes. In particular, referring to FIG. 7, network analysis of enriched gene ontology terms demonstrated one large contiguous network of neuronal related processes and other discontinuous networks of non-neuronal processes. Thus, while there is some overlap present in enrichment between ODI and NDI specifically in the synaptic cellular components, the percentage of genes that correlate with ODI is much smaller than the primary signal captured by NDI, again highlighting the increased specificity of the ODI signal. Referring to FIG. 8, within each network (and network node), the relative contribution of GO CC terms from each clade were coded. The largest network, which primarily describes intracellular/intraneuronal processes, is seen to contain predominantly GO terms arising from NDI clade 2, consistent with the expectation that the NDI MR signal is correlated to intracellular gene expression. Similarly, ODI clade 2 is strongly correlated to GO terms arising from ODI clade 1, which primarily contains GO CC terms associated with the extracellular matrix. Altogether, these data demonstrate the strong correlation of a biophysically defined imaging signal to gene expression consistent with the modeled cellular compartment.

Experiment 2

To advance this new field of neurodevelopmental radiomic studies and work directly towards the goal of autism subtyping, a further study was conducted using radiomic analyses applied to MC-DWI neuroimaging data comparing four different monogenetic rat models of ASD using radiomics. Previous reported work from our group demonstrated an inability to effectively distinguish between the models when using conventional metrics of analysis (e.g., voxel-wise comparisons, ROI mean signal intensity) on the intra-neurite signals of FA and NDI from the DTI and NODDI models, as described in Rowley P A, Guerrero-Gonzalez J, Alexander A L, Yu J P J. Convergent microstructural brain changes across genetic models of autism spectrum disorder—A pilot study. Psychiatry Res Neuroimaging 2019; 283:83. https://doi.org/10.1016/J.PSCYCHRESNS.2018.12.007. and Barnett B R, Casey C P, Torres-Vel'azquez M, Rowley P A, Yu J P J. Convergent brain microstructure across multiple genetic models of schizophrenia and autism spectrum disorder: a feasibility study. Magn Reson Imaging 2020; 70:36-42. https://doi.org/10.1016/J.MRI.2020.04.002., each of which is incorporated herein by reference. A new study was developed to demonstrate that the coupling of a neuro-biologically sensitive neuroimaging technique (NODDI diffusion weighted imaging) to radiomic analyses enhances our collective ability to discriminate neurobiologically dissimilar models of ASD and even begin to subtype these models in an unsupervised fashion.

Male Sprague Dawley rats (300-325 g, Charles River) were pair housed in clear cages (lights on for 12 h at 7:00 A.M.) with ad libitum access to food and water; experiments were performed between 10:00 A.M. and 3:00 P.M. Facilities and procedures followed the National Institutes of Health Guide for the Care and Use of Laboratory Animals and were approved by the Institutional Animal Care and Use Committee at our institution. $Fmr1^{-/y}$, $Nrxn1^{-/-}$, and $Pten^{-/+}$ genetic rat models of ASD were commercially obtained (Horizon Discovery, St. Louis, MO, USA). These models were generated via zinc finger nuclease (ZFN) genome editing yielding a hemizygous, homozygous, and heterozygous genotype on the outbred Sprague Dawley background, respectively. Endonuclease hemizygous deletion of the Fmr1 gene mirrors the gene silencing observed with expansion of the CGG trinucleotide. Monoallelic deletion of the Pten gene recapitulates the clinically encountered heterozygous genotype as the homozygous deletion is embryonic lethal. These animals used in our data analyses were born, weaned, and matured to adulthood in the same housing facility.

MRI Acquisition

Animals ($Nrxn1^{-/-}$, $Pten^{-/+}$, $Fmr1^{-/y}$ [n=4 each]; $Disc1^{-/-}$ [n=6] and their controls [n=5]) at postnatal 45 days were brought to a surgical plane of anesthesia with isoflurane, then transcardially perfused with ice-cold phosphate-buffered solution (PBS) followed by 4% paraformaldehyde (PFA). The animals were decapitated, and the skin, muscle and fascia were removed from the dorsal and posterior parts of the skull. Rongeurs were used to remove the skull and scissors were used to cut the meninges and cranial nerves at the base of the brain. Extracted brains were post-fixed in 4% PFA for 24 h and then immersed in Fluorinert and placed in a custom-built holder. Brains were imaged with a 4.7 T Agilent MRI system with a 3.5 cm diameter quadrature volume RF coil. Multi-slice, diffusion-weighted, spin echo images were used to acquire 10 non-diffusion-weighted images (b=0 s·mm$^{-2}$) and 75 diffusion-weighted images (25: b=800 s·mm$^{-2}$, 50: b=2000 s·mm$^{-2}$), using non-colinear diffusion-weighting directions. Other imaging parameters: TE/TR=24.17/2000 ms, FOV=30×30 mm2, matrix=192×

192 reconstructed to 256×256 for an isotropic voxel size of 0.25 mm over two signal averages; d=6 ms; D=12.20 ms. All imaging was performed in a temperature-controlled room with imaging performed between 20 and 21 degrees C. Raw data files were converted to NIfTI (Neuroimaging Informatics Technology Initiative) format for use with the DTITK software package. Following correction for eddy currents and standard preprocessing, tensors are reconstructed, registered, and normalized to a study-specific template. Multi-shell diffusion data were then fitted to the NODDI model with the microstructure diffusion toolbox (MDT) and the quantitative indices were calculated.

Following spatial normalization, ROIs were masked and segmented using a standard DTI-based rat brain atlas. Regions of interest (ROI) are defined via automated atlas-based anatomic segmentation using a diffusion tensor-based reference label set. Analytical pipelines were specifically designed for imaging data collected from fixed samples (e.g., using recommended diffusivity assumptions $d_\parallel=0.6\times 10^{-3}$ mm$^2$/s and the diso=$2\times 10^{-3}$ mm$^2$/s and using the 'WatsonSHStickTortIsoVIsoDot_B0' fitting model as recommended).

Region of Interest (ROI) Mean Signal Analysis

The amygdala, hippocampus, and corpus striatum were a priori selected for analysis due to their biological relevance in autism spectrum disorder. For each of the three NODDI signals (ODI, NDI, CSF), a 5×1 ANOVA regressing mean signal intensity on genotype for each region of interest was performed, while controlling the false discovery rate to 0.05 using the Benjamini-Hochberg FDR correction to identify significant differences in mean signal intensity. The Tukey HSD test was performed for post-hoc pairwise comparisons for a significant model (as defined with FDR corrected p-value<0.05). Significant pairwise differences were those with Tukey HSD corrected p-value<0.05. All p-values reported are Tukey HSD corrected p-values unless otherwise indicated. All analyses were performed with GraphPad Prism 9 and Python 3.

Image Texture Feature Extraction and Radiomic Analysis

Following masking and segmentation, each ROI was then processed using the open-source Pyradiomics package to extract image texture features. A fixed bin-width of 0.1 was used for gray-level discretization for all the images and feature extraction was performed for 18 first-order statistic, 24 gray-level cooccurrence matrix (GLCM), 14 gray-level dependence matrix (GLDM), 16 gray-level run length matrix (GLRLM), and 16 gray-level size zone matrix (GLSZM) radiomic features. A Pearson correlation cutoff of 0.9 is used to select non-redundant features and 51 ANOVA models were fit for each selected feature within a region of interest for a given imaging signal to determine the main effect of genotype on these features. The Benjamini-Hochberg procedure was used to control the FDR of a significant model to 0.05. The Tukey HSD test was performed for post-hoc pairwise comparisons for a significant model. Significant pairwise differences were those with Tukey HSD corrected p-value<0.05. All p-values reported are Tukey HSD corrected p-values unless otherwise indicated. All analyses were performed with GraphPad Prism 9 and Python 3.

Clustering Analyses

Hierarchical clustering was performed using the Python library sci-kit learn. All features used for clustering were standardized across samples to have a mean of 0 and standard deviation of 1 before using the Ward's Minimum Variance clustering method with Euclidean distance metric.

Mean Differences Between ROIs are Only Present in the ODI Signal

Recapitulating our prior work, no significant mean differences were identified between any of the preselected ROIs in the NDI or vISO diffusion signals. However, significant ODI mean signal ROI differences were identified in the right hippocampus (R HC), left hippocampus (L HC), and right corpus striatum (F-statistics for each ROI respectively, $F(4,18)=5.450$, FDR-adjusted p-value=0.0260; $F(4,18)=3.776$, FDR-adjusted p-value=0.0424; $F(4,18)=3.848$, FDR-adjusted p-value=0.0424). Specifically, pairwise testing demonstrates a significant increase in mean ODI of the right and left hippocampus of the Nrxn1 KO compared to control animals (R HC: mean diff.=0.0455, 95% CI=[0.0128, 0.0782], p-value=0.0043; L HC: mean diff.=0.0319, 95% CI=[0.00250, 0.0613], p-value=0.0298). Nrxn1 KO animals also had significantly higher mean signal in the right hippocampus when compared to the Pten KO animals (mean diff.=0.0347, 95% CI=[0.0002, 0.0682], p-value=0.0478) and in the right corpus striatum when compared to the Disc1 KO animals (mean diff.=0.0649, 95% CI=[0.0103, 0.120], p-value=0.0156). The Fmr1 KO animals had significantly higher mean signal in the right hippocampus when compared to control (mean diff.=0.0346, 95% CI=[0.00190, 0.0673], p-value=0.0352).

ODI Mean Signal Cannot Generate Discrete Genetic Subtype Clustering with Hierarchical Clustering In our previously reported work, k-means clustering on principal components generated from the mean signal from FA and NDI from 12 ROIs failed to separate the data into genetic subtypes. However, with the presence of mean ODI signal intensity differences between ROIs, unsupervised hierarchical clustering was next performed with the three mean ODI signals with significant differences amongst the animal models. By using the mean signal from these ROIs identified through the ANOVA, we aimed to maximize the amount of relevant information provided to the clustering algorithm as the mean ODI signal from all ROIs did not produce meaningful clustering. The clustering generates three clusters. The Pten KO animals are all located within one cluster. However, we observed that all clusters contain a mix of several genotypes each, indicating poor clustering and sub-typing of genetic models based on mean ODI signal intensity information alone.

Differences in Radiomic Features Identified for Bilateral Hippocampus in ODI Signal To test our hypothesis that radiomic features encode greater discriminatory information than mean ROI signal intensity alone, all three NODDI signals (NDI, ODI, and vISO) for each region of interest underwent radiomics processing. 88 texture features, consisting of the first order (histogram) and second order (texture) features, per signal per region of interest were extracted. No transformations, such as wavelet decomposition, were applied to the images to maintain the highest degree of interpretability for each radiomic feature. These extracted features underwent unsupervised correlation cutoff feature selection (i.e., filtering features that had >0.9 Pearson correlation with each other). Each of the remaining features were individually fit to a 5×1 ANOVA and the Benjamini-Hochberg FDR correction was used to identify significant ANOVA results. These significant models then underwent post-hoc Tukey pairwise significance testing. From all the signals, ROIs, and radiomic features tested, 7 total features were identified as significantly different following FDR correction. 5 were identified in the ODI signal from the right hippocampus (GLRLM Long Run Low Gray Level Emphasis: $F(4,18)=11.470$, FDR-adjusted p-value=0.009; GLRLM Run Variance: F(4, 18)=7.838, FDR-adjusted p-value=0.0261; GLSZM High Gray Level Zone Emphasis: F(4,18)=7.960, FDR-adjusted p-value=0.0435; First Order Uniformity: F(4,18)=5.488, FDR-adjusted p-value=0.0209; GLCM Difference Variance: F(4,18)=7.310, FDR-adjusted p-value=0.0472) and 2 were identified in the ODI signal from the left hippocampus (GLRLM Long Run Low Gray Level Emphasis: F(4,18)=8.158, FDR-adjusted p-value=0.0120; 5b, GLSZM Small Area High Gray Level Emphasis: F(4,18)=8.656, FDR-adjusted p-value=0.0481).

As for the significant pairwise differences, for the right hippocampus, Nrxn1 KO animals were significantly lower in First Order Uniformity when compared to control and Pten KO animals (Nrxn1 KO vs. control: mean diff.=-0.0315, 95% CI32 [-0.0616, -0.00164], p-value=0.0359; Nrxn1 KO vs. Pten KO: mean diff.=-0.0439, 95% CI=[-0.07548, -0.0123], p-value=0.0043). Nrxn1 KO animals were significantly lower in Long Run Low Gray Level Emphasis and Run Variance compared to control (Long Run Low Gray Level Emphasis, Nrxn1 KO vs. control: mean diff.=-0.751, 95% CI=[-1.162, -0.3398], p-value=0.0003; Run Variance, Nrxn1 KO vs. control: mean diff.=-0.5310, 95% CI=[-0.9072, -0.1549], p-value=0.0037). Nrxn1 KO animals were significantly higher in High Gray Level Zone Emphasis compared to control and Pten KO animals (Nrxn1 KO vs. control: mean diff.=4.510, 95% CI=[1.284, 7.730], p-value=0.0040; Nrxn1 KO vs. Pten KO: mean diff.=4.745, 95% CI=[1.348, 8.143], p-value=0.0041) Fmr1 KO animals were significantly lower in Long Run Gray Level Emphasis and Run Variance compared to control (Long Run Low Gray Level Emphasis, Fmr1 KO vs. control: mean diff.=-0.771, 95% CI=[-1.182, 0.3597], p-value=0.0002; Run Variance, Fmr1 KO vs. control: mean diff.=-0.521, 95% CI=[-0.897, -0.145], p-value=0.0044). Disc1 KO animals were significantly higher in High Gray Level Zone Emphasis and Difference Variance compared to control and Pten KO animals (High Gray Level Zone Emphasis, Disc1 KO vs. control: mean diff.=3.544, 95% CI=[0.634, 6.453], p-value=0.0129; Disc1 KO vs. Pten KO: mean diff.=3.782, 95% CI=[0.6802, 6.883], p-value=0.0128; Difference Variance, Disc1 KO vs. control: mean diff.=0.163, 95% CI=[0.055, 0.268], p-value=0.002; Disc1 KO vs. Pten KO: mean diff.=0.156, 95% CI=[0.042, 0.270], p-value=0.0049). Disc1 KO animals were significantly lower in the Long Run Low Gray Level Emphasis and Run Variance compared to control animals (Long Run Low Gray Level Emphasis, Disc1 KO vs. control: mean diff.=-0.5954, 95% CI=[-0.9667, -0.2241], p-value=0.0011; Run Variance, Disc1 KO vs. control: mean diff.=-0.5567, 95% CI=[-0.8962, -0.2172], p-value=0.0009). Disc1 KO animals were significantly lower in Uniformity compared to Pten KO animals (Disc1 KO vs. Pten KO: mean diff.=-0.0300, 95% CI=[-0.0589, -0.00117], p-value=0.392). Pten KO animals were significantly lower in Long Run Low Gray Level Emphasis compared to control animals (Pten KO vs. control: mean diff.=-0.6155, 95% CI=[-1.027, -0.204], p-value=0.0021).

For the left hippocampus, Nrxn1, Fmr1, and Disc1 KO animals were significantly lower in Long Run Low Gray Level Emphasis when compared to control animals (Nrxn1 KO vs. control: mean diff.=-0.4177, 95% CI=[-0.683, -0.153], p-value=0.0013; Fmr1 KO vs. control: mean diff.=-0.4185, 95% CI=[-0.684, -0.153], p-value=0.0013; Disc1 KO vs. control: mean diff.=-0.313, 95% CI=[-0.552, -0.074], p-value=0.0072). Nrxn1, Fmr1, and Disc1 KO animals were significantly higher in Small Area High Gray Level Emphasis than Pten KO animals (Nrxn1 KO vs. Pten KO: mean diff.=4.642, 95% CI=[0.944, 8.340], p-value=0.0102; Fmr1 KO vs. Pten KO: mean diff.=4.537, 95% CI=[0.839, 8.234], p-value=0.0122; Disc1 KO vs. Pten KO: mean diff.=6.061, 95% CI=[2.685, 9.437], p-value=0.0003). Disc1 KO animals were also significantly higher than controls for this this feature (Disc1 KO vs. control: mean diff.=3.705, 95% CI=[0.538, 6.872], p-value=0.0175). No significant features were identified in either the NDI or CSF signals across all regions of interest tested.

Figure 9:
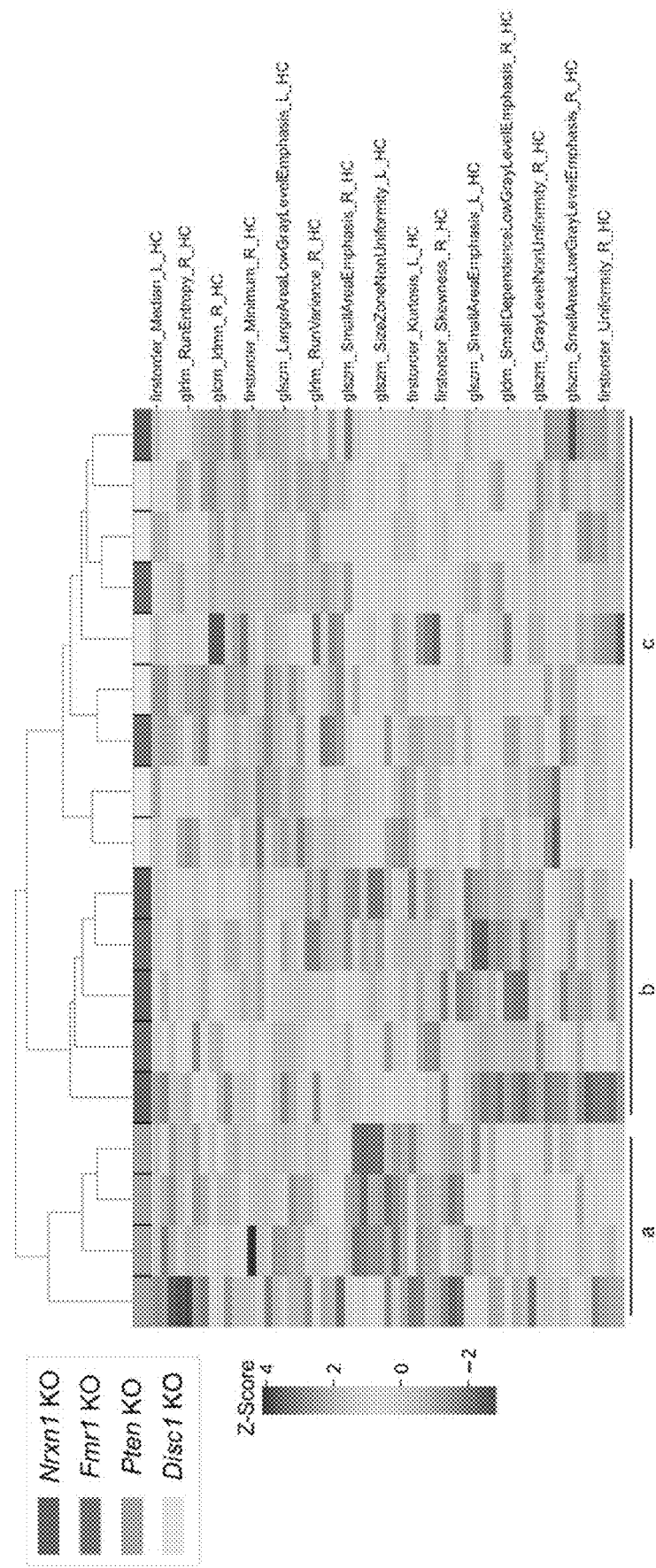
FIG. 9 is a hierarchical clustering of mean ODI signal providing minimally interpretive clustering.

Hierarchical Clustering of Radiomic Features Derived from the ODI Signal Improves Performance of Genetic Subtyping Using all radiomic features from the bilateral hippocampus after correlation filtration, unsupervised hierarchical clustering was again performed as previously described with the mean ODI signal. Three distinct clusters are generated as illustrated in FIG. 9 and identified as "a", "b", and "c". Cluster a contains only Pten KO animals. Cluster c contains all Disc1 KO animals. Clusters b and c contain a mix of Fmr1 KO and Nrxn1 KO animals. When compared to the hierarchical clustering performed on mean ODI signal intensity only, we find improved discrimination, clustering, and subtyping of our genetic models using radiomic data. However, when performing hierarchical clustering using only the significant features from the ANOVA, the clustering performs more poorly, suggesting that features that did not survive the strict FDR cutoff still contain relevant discriminatory information.

Improved autism diagnostics are paramount for advancing the development of new, precise therapeutics for this patient population. Thus, the above-described study shows that the concept of cluster analysis can be used to for analysis of NODDI diffusion data and its use for identifying genetic subtypes of autism. As described above, the present disclosure provides a way to use MR data to understand the underlying gene expression and, thus, this shows that the systems and methods provided herein can be used to investigate, diagnose, track, and understand, underlying conditions, in this non-limiting example, autism, which is a complex and wildly-varied condition.

In the non-limiting example of a study focused on autism, we employed this analysis on four monogenetic rat models of autism spectrum disorder and demonstrate improved sensitivity and specificity of a combined NODDI-radiomics approach over more conventional and traditional ROI mean signal analyses.

Figure 10:
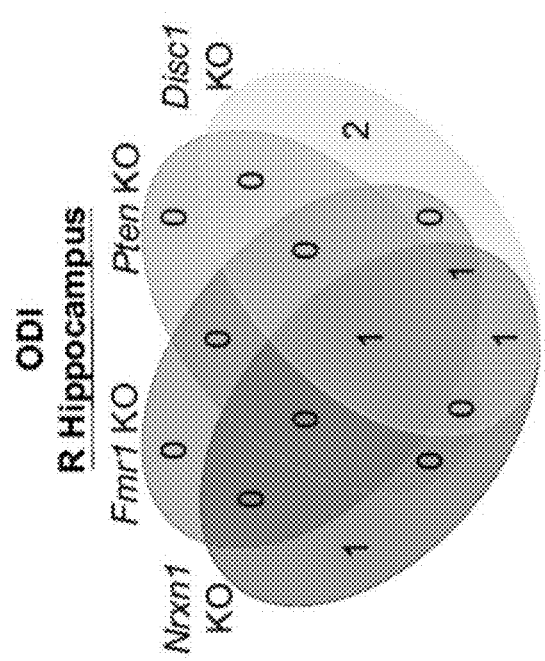
FIG. 10 is a Venn diagram of model differences in the right hippocampus ODI signal that demonstrate unique subsets of radiomic features that specifically define each genetic subtype.

The radiomics analysis identified the ODI signal from the bilateral hippocampus as being different between the different genetic models and their control. While this result ostensibly matches the conventional mean signal analysis, our radiomics analysis provides greater granular insight into the nature of these differences in the ODI signal as multiple texture differences are identified per region of interest. In the conventional mean signal analysis, both the Fmr1 and Nrxn1 models demonstrated an increase in mean ODI signal compared to control. While this distinguishes them from the Disc1 and Pten models, this conventional ROI-based neuroimaging analysis lacks enough specificity to provide further distinctions between the models despite the fact these data suggest significant neurobiological changes are occurring in the extra-neurite space. However, when comparing radiomic data of the ODI signal from the four ASD models and their control, a unique set of differences is established for all four models, illuminating underlying information in the signal that was not previously apparent with conventional mean intensity analysis. Further, our radiomics analysis of the right hippocampus (when comparing to control animals) identified unique features able to discriminate Fmr1 from Nrxn1 KO, suggesting that the extra-neurite microstructural information encoded in the ODI signal for these genetically different animals is not the same, as illustrated in FIG. 10. Interestingly, common features exist between all four models, which demonstrates aspects of convergence as previously reported by our group and further highlights and emphasizes the additional gene-specific information that is extracted via our NODDI-radiomics approach. This indicates that the increased parametrization of the ODI signal enables higher discrimination of the data, thus improving the specificity of the information provided by the ODI signal.

Previous studies from both our laboratory and others have demonstrated convergence of microstructural alterations across autism models and have characterized the macrostructural relationships between the brains of different models of autism. Our results demonstrate the possibility of individual genetic subtyping of autism models, a task that has not been directly addressed with genetic models of autism.

Ellegood et al. (Ellegood J, Anagnostou E, Babineau B A, Crawley J N, Lin L, Genestine M, et al. Clustering autism: using neuroanatomical differences in 26 mouse models to gain insight into the heterogeneity. Mol Psychiatry 2015; 20:118-25. https://doi.org/10.1038/MP.2014.98.) performed a large clustering analysis of genetic autism mouse models using volumetric measurements of neuroanatomy. This work established group-based differences and similarities between various models of autism through hierarchical clustering but did not explore individual animal subtyping with their volumetric measurements. Using our hippocampal ODI radiomic data, we produced three distinct clusters in which genetic information is contained: one cluster comprised solely of Pten animals, another cluster containing all Disc1 animals, and a mixed cluster of Fmr1 and Nrxn1 animals. While two of the clusters contain all animals of a particular genetic subtype, the mixed cluster of Fmr1 and Nrxn1 suggests that these animals are more difficult to discriminate. This combined clustering of Fmr1 and Nrxn1 based upon neuroimaging has been previously reported by Ellegood et al., suggesting there is shared underlying neurobiology captured at both the gross structural scale and the microstructural scale in this analysis for these disease models. Also, performing clustering of the 7 significant radiomic features as identified through ANOVA did not disambiguate Fmr1 from Nrxn1 and overall produced less distinct genetic clustering. This difference in clustering performance may suggest that the stringent statistical selection of radiomic features reduced the amount of biological information truly captured in the imaging signal.

Overall, our analytical approach indicates that unsupervised hierarchical clustering of NODDI radiomic data can meaningfully categorize a mixed genetic population, which proves to be a highly salient advance as we move towards the clinical translation of advanced neuroimaging methods. Although genetic subtyping of monogenetic ASD is important, the polygenetic and sporadic nature of de novo mutations commonly found in ASD suggests the methods that are able to capture, quantify, and discriminate biologically-related subtypes of ASD will be critical for understanding how genetic alterations associated with ASD are related to brain microstructure. As highlighted with our Fmr1 and Nxrn1 example above, our NODDI-radiomics approach mirrors a likely clinical vignette where most patients with autism are unlikely to have monogenetic disease but rather novel sporadic mutations. With further data or metrics, such as described above, the systems and methods provided herein can better subgroup and cluster patients based on neural microstructure rather than more subjective clinical evaluations or broad genetic categories. Doing so, creates neuro-microstructurally (and thus neurobiologically) relevant and related subgroups of ASD patients for further study and tailored treatment beyond what is possible with current neuroimaging analyses.

Strikingly, the ODI signal provided all the significant differences identified in this study. Our previous analyses focused on the axonal (FA) and intraneuritic (NDI) signals of DTI and NODDI, respectively, which were unable to disambiguate these animal models from each other. On the other hand, the ODI signal captures the extra-neurite compartment of NODDI. Recent research suggests that non-neuronal cells and extracellular components in the brain contribute meaningfully to neuropsychiatric disease. Our group has found that changes in the ODI signal can correspond to changes in microglia number, morphology, and activation state in various disease models. For this study, the observed changes in the ODI signal of the NODDI model may suggest potential differences in microglia or other cellular and molecular components of the extra-neurite space across these models of autism. The Disc1 KO model has been characterized to have altered microglial number and morphology in the dentate gyrus and recent studies have implicated perineuronal nets (a specific component of the extracellular matrix) and altered hippocampal stem cell niche in in the pathogenesis of autism behaviors in genetic mouse models such as Fmr1. Our new findings in conjunction with our previous results highlight how MC-DWI models, such as but not limited to NODDI, can capture more complete, sensitive neurobiological signals that are beyond conventional imaging approaches used today.

A common critique of radiomic studies is the lack of standardization and reproducibility. It has been demonstrated repeatedly that a common source of discrepancy arises from non-standardized region of interest segmentation. Small alterations in brain alignment and ROI segmentation can have drastic effects on the radiomic features calculated and thus affect the reproducibility of downstream analyses and generalizability of predictive models. This is of particular of concern in calculating radiomic features of neuroglial tumors in which the shape and borders of the tumors can be heterogenous and non-distinct. To account for this known limitation, we aligned all brains to a common subject space and performed automated ROI segmentation of annotated neuroanatomical regions. Similarly, radiomic feature extraction and calculation can use gray-level discretization which is determined by a user-set parameter or can be automated using rules that apply more consistently than human selection. Studies have demonstrated that varying discretization level in MRI and CT radiomic analyses can also drastically affect the calculated features and thus the method for discretization can be standardized. Though no formal guidelines exist for discretizing NODDI diffusion MRI images, previous MRI radiomics papers have suggested using a fixed bin-width rather than a fixed bin-number to improve reproducibility across processed images. To this recommendation, we performed gray-level discretization with a fixed bin-width of 0.1 for all images and signals analyzed. By following these methods of standardization, our radiomics analysis pipeline ensures higher reproducibility than many radiomics studies that have been published.

Experiment 2 demonstrates the ability to employ radiomic analyses of NODDI diffusion data to facilitate meaningful categorization and neuroimaging-based subtyping. The results identified differences in the extra-neurite compartment of the hippocampus between these models of autism, which is a previously unreported finding. Using these radiomics data, we also demonstrated the potential to perform hierarchical clustering that could potentially cluster monogenetic sub-types of autism in an unsupervised manner. Developing this ability to subtype based on underlying microstructural difference represents an important first step towards improved, biologically informed sub-grouping that is helpful as we seek to advance our understanding of ASD and the development of novel therapies for this underserved group of patients. The systems and methods provided herein also apply to other pathologies or conditions that can be identified, understood, tracked, or studied via neurobiology or pathophysiology, such as gene expression. As non-limiting examples, the systems and methods can be applied to neurodegenerative diseases. The system and methods provided herein can be applied to Alzheimer's disease.

Despite modern efforts aiming to describe the effect of gene expression on imaging-derived phenotypes (IDPs), a more precise relationship between the MR signal and gene expression remains was previously unavailable. As described above, the present disclosure uncovered and demonstrated an intrinsic relationship between gene expression and the biophysically modeled diffusion signal and defined a new heuristic to understand the relationship between quantitative neuroimaging and gene expression in the brain. Specifically, multi-compartment diffusion data, such as NDI and ODI, can be used to understand spatially defined functional gene expression. The presence of biologically salient intrinsic gene expression correlates in dMRI further and the present disclosure provides a genetic mechanisms for a given neural phenotype and expands the understanding of the fundamental relationship between the MR signal and neurobiology.

The present disclosure provides system and methods for using non-invasively-acquired diffusion-weighted MR imaging to provide diagnosis and prognosis of neurological pathology. Biological inferences into molecular pathophysiology is performed through analysis of texture features from multi-compartment diffusion weighted MR. To improve the specificity of imaging data, highly parameterized texture features from multi-compartment diffusion weighted medical imaging data can be quantified. Texture features capture the spatial relationship between signals in an image.

The use of these features for biomarker development is predicated on the new understanding that texture features capture specific information about the underlying pathophysiology of the imaged region. The studies described above show that texture features are correlated with underlying gene expression of the cells in the imaged region. In the non-limiting studies, the correlation between MC-DWI modeled texture features of an imaged region and gene expression of the same imaged region has been demonstrated to meaningfully capture the molecular pathophysiology with non-invasive diffusion weighted MR imaging.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

As used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of one or more of each of multiple of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

The above-described system may be configured or otherwise used to carry out processes in accordance with the present disclosure. In particular, as will be described in further detail, the present invention has been described in terms of one or more preferred embodiments, and it should be appreciated that many equivalents, alternatives, variations, and modifications, aside from those expressly stated, are possible and within the scope of the invention.

The invention claimed is:

1. A magnetic resonance imaging (MRI) system comprising:
    a magnet system configured to generate a polarizing magnetic field about at least a portion of a subject arranged in the MRI system;
    a plurality of gradient coils configured to apply a gradient field to the polarizing magnetic field;
    a radio frequency (RF) system configured to apply an excitation field to the subject and acquire MR image data from the subject; s
    a computer system programmed to:
        control the plurality of gradient coils and the RF system to acquire diffusion-weighted MR image data;
        process the diffusion-weighted MR image data using a radiomic analysis to generate texture features;
        analyze the texture features to determine diagnostic or prognostic information about the subject; and
        generate a report communicating the diagnostic or prognostic information about the subject;
    wherein analyzing the texture features to determine diagnostic or prognostic information about the subject includes determining, using the texture features, information about gene expression in the subject.

2. A method for performing transcriptomic MRI (TMRI) analysis of a subject, the method comprising:
    accessing diffusion-weighted MR image data acquired from the subject;

processing the diffusion-weighted MR image data using a multi-compartment model;
processing the diffusion-weighted MR image data using a radiomic analysis to generate texture features;
analyzing the texture features to determine diagnostic or prognostic information about the subject; and
generating a report communicating the diagnostic or prognostic information about the subject;
wherein analyzing the texture features to determine diagnostic or prognostic information about the subject includes determining, using the texture features, information about gene expression in the subject.

3. The MRI system of claim 1, wherein the diagnostic or prognostic information about the subject includes an indication of a neurocognitive, a neurodegenerative, a neuropsychological, or a cancer pathology.

4. The MRI system of claim 1, wherein analyzing the texture features includes performing an unsupervised hierarchical clustering analysis.

5. The MRI system of claim 1, wherein analyzing the texture features includes accessing at least one look-up table that correlates the texture features to diagnostic or prognostic information about the subject.

6. The MRI system of claim 1, wherein processing the diffusion-weighted MR image data includes using a multi-compartment diffusion model.

7. The MRI system of claim 1, wherein the diffusion-weighted MR image data includes neurite orientation dispersion and density imaging (NODDI) data.

8. The MRI system of claim 1, wherein analyzing the texture features to determine diagnostic or prognostic information about the subject includes providing the texture features to a trained neural network or machine learning system.

9. The MRI system of claim 1, wherein generating the report communicating the diagnostic or prognostic information about the subject includes providing the texture features to a trained neural network or machine learning system.

10. The MRI system of claim 1, wherein analyzing the texture features to determine diagnostic or prognostic information about the subject includes determining, using the texture features, information about gene expression in the subject.

11. The method of claim 2, wherein the diagnostic or prognostic information about the subject includes an indication of a neurocognitive, a neurodegenerative, a neuropsychological, or a cancer pathology.

12. The method of claim 2, wherein analyzing the texture features includes performing an unsupervised hierarchical clustering analysis.

13. The method of claim 2, wherein analyzing the texture features includes accessing at least one look-up table that correlates the texture features to diagnostic or prognostic information about the subject.

14. The method of claim 2, wherein processing the diffusion-weighted MR image data includes using a multi-compartment diffusion model.

15. The method of claim 2, wherein the diffusion-weighted MR image data includes neurite orientation dispersion and density imaging (NODDI) data.

16. The method of claim 2, wherein analyzing the texture features to determine diagnostic or prognostic information about the subject includes providing the texture features to a trained neural network or machine learning system.

17. The method of claim 2, wherein generating the report communicating the diagnostic or prognostic information about the subject includes providing the texture features to a trained neural network or machine learning system.

18. The MRI system of claim 7, wherein the computer system is further configured to process the NODDI data to determine at least one of a neurite density index (NDI) or an orientation dispersion index (ODI) component of the NODDI data.

19. The method of claim 15, further comprising processing the NODDI data to determine at least one of a neurite density index (NDI) or an orientation dispersion index (ODI) component of the NODDI data.

* * * * *